(12) United States Patent
Chang

(10) Patent No.: US 7,309,138 B2
(45) Date of Patent: Dec. 18, 2007

(54) BACKLIGHT MODULE AND METHOD OF ASSEMBLING THE SAME

(75) Inventor: Shun Nan Chang, Tainan County (TW)

(73) Assignee: Chi Mei Optoelectronics Corp., Tainan (TW)

( * ) Notice: Subject to any disclaimer, the term of this patent is extended or adjusted under 35 U.S.C. 154(b) by 388 days.

(21) Appl. No.: 11/144,888

(22) Filed: Jun. 6, 2005

(65) Prior Publication Data

US 2005/0281055 A1    Dec. 22, 2005

(30) Foreign Application Priority Data

Jun. 16, 2004    (TW) .............................. 93117337 A

(51) Int. Cl.
*G02F 1/1335* (2006.01)

(52) U.S. Cl. ........................ 362/186; 362/561; 362/30; 362/581

(58) Field of Classification Search ................. 362/186, 362/561, 30, 581, 97, 33
See application file for complete search history.

(56) References Cited

U.S. PATENT DOCUMENTS

2005/0254236 A1*    11/2005    Fu et al. ...................... 362/186

* cited by examiner

*Primary Examiner*—Truc Nguyen

(57) ABSTRACT

A backlight module and method of assembling the same. At least one fitting structure is formed on each of the top surface and side surface of an exterior frame of the backlight, and a fitting member is provided for each fitting structure. A plurality of fitting structures is formed on the fitting members to be engaged with the fitting structures of the top and side surfaces, such that the backlight films of the backlight module can be properly held between the exterior frame and the fitting members.

18 Claims, 8 Drawing Sheets

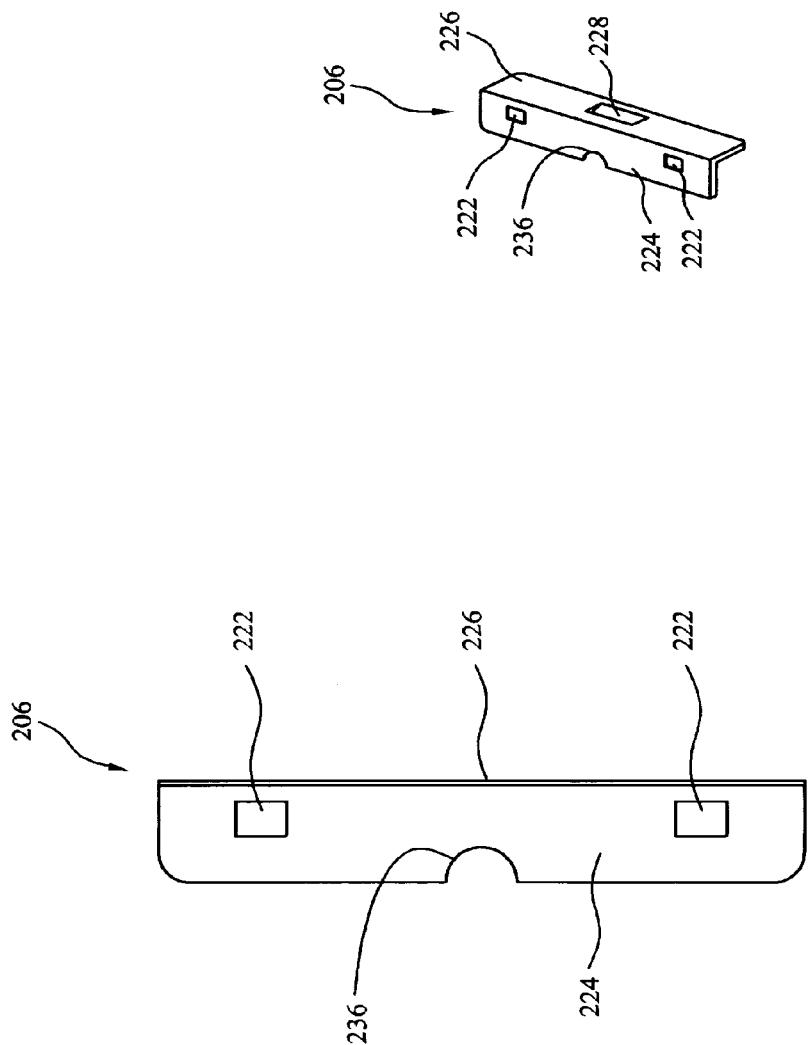

BACKLIGHT MODULE AND METHOD OF ASSEMBLING THE SAME

BACKGROUND OF THE INVENTION

1. Field of Invention

The present invention relates in general to a backlight module and a method of assembling the same, and more particularly, to a backlight module having a fitting element effectively supports the backlight films thereof.

2. Related Art

The backlight module is one of the key components of a liquid crystal display. As liquid crystal is not a self-illuminant material, a backlight module is always required for supplying a source light of a liquid crystal display. With the light source supplied by the backlight module, the liquid crystal panel is operative to provide an image with uniform brightness. Typically, a backlight module includes a plurality of backlight films, including diffuser and prism, for example, for improving the uniformity of light distribution, so as to enhance the direction of the emission. Thereby, the front brightness of the panel is increased.

FIG. 1 illustrates the conventional fitting design for the backlight films. In the conventional backlight module 100, silicon resin is typically applied to the edge of the backlight film 104 to form a tape 106. The backlight film 104 is then adhered to the top surface 108 of the exterior frame 102 of the backlight module 100 with the tape 106.

As the display apparatus becomes more and more compact, the internal structure of the backlight module is consequently more and more delicate. Therefore, the silicon resin tape has to be formed thinner and thinner, and softer and softer. Therefore, the application of the tape becomes too laborious and time consuming. Moreover, the attachment quality is difficult to control. Further, as the adhesion of silicon resin tape is not strong enough. Particularly, the high-temperature and humidity test, impact test, reliability test and aging effect show the displacement problem of the silicon resin tape. On the other hand, as the edges of backlight films are adhered to the exterior frame by the tape, the backlight films are stopped from reacting with thermal expansion. When the temperature is high enough to cause thermal expansion of the backlight films, the backlight films, with the permanent fixed edges, will bulge to form wavy structure. This seriously affects the image quality. Further, the tape dimension varies greatly with the dimension of the display. Therefore, various specifications required for different dimensions of displays greatly increase the production cost.

SUMMARY OF THE INVENTION

A fitting member is provided to support backlight films of a backlight structure. The fitting member is kept with an adequate distance to the plane of the backlight module. A displacement limit is provided along the vertical direction, such that the film is prevented from being peeled. This does not only effectively support the backlight films, but also provides a space allowing the thermal expansion of the backlight films. Therefore, the wavy structure can be prevented.

A backlight module including the above mentioned fitting member is provided. The fitting member is installed on an exterior frame of a light guide plate. The assembly is easily detached, and the backlight films can be easily attached to the light guide plate.

A method of fitting the backlight films is provided, which uses the fitting members installed on the exterior frame to hold the lugs of the backlight films extending over the top surface of the exterior frame. Thereby, the backlight films can be easily attached to the exterior frame without using the tape. The assembly is thus simplified, the assembly time is shortened, and the cost is reduced.

The backlight module of the present invention suitable for use in a display includes a light guide plate, an exterior frame, at least one backlight film and a first fitting member. The exterior frame covers a periphery of the light guide plate, and includes at least one top surface having a first fitting structure at a first side of the exterior frame and at least one side surface connected to one side of the top surface, the side surface having at least one second fitting structure at the first side of the exterior frame. The backlight film is over the light guide plate, wherein the backlight film includes a first lug extending next to the first fitting structure. The first fitting member includes a first extension having a third fitting structure to be engaged with the first fitting structure, and a second extension connected to one side of the first extension, the second extension having at least one fourth fitting structure to be engaged with the second fitting structure.

According to one preferred embodiment of the present invention, the first fitting structure includes a plurality of first fitting elements protruding from the top surface, and the third fitting structure includes a plurality of first holes allowing the first fitting elements to extend through. The second fitting structure includes at least one slot recessed from the side surface and the fourth fitting structure includes at least one protruding sheet punched at the second extension.

The method of making the backlight module of the present invention suitable for use in a display includes providing a light guide plate, providing an exterior frame, providing at least one backlight film and providing a first fitting member. The exterior frame covers a periphery of the light guide plate, and includes at least one top surface having a first fitting structure at a first side of the exterior frame and at least one side surface connected to one side of the top surface, the side surface having at least one second fitting structure at the first side of the exterior frame. The backlight film is over the light guide plate, wherein the backlight film includes a first lug extending next to the first fitting structure. The first fitting member includes a first extension having a third fitting structure to be engaged with the first fitting structure, and a second extension connected to one side of the first extension, the second extension having at least one fourth fitting structure to be engaged with the second fitting structure.

According to one preferred embodiment of the present invention, there are three fitting members respectively installed on three sides of the display except the location of the cold-cathode lamp.

The fitting member of the present invention suitable for use in a display to support a backlight film of a backlight module includes an exterior frame covering a periphery of the backlight module. The exterior frame includes at least a top surface having at least one first fitting structure, and at least a side surface connected to one side of the top surface, the side surface having at least one second fitting structure. The fitting member includes a first extension and a second extension. The first extension has a third fitting structure to be engaged with the first fitting structure. The second extension is connected to one side of the first extension, the second extension having at least one fourth fitting structure to be engaged with the second fitting structure.

According to one preferred embodiment of the present invention, the first fitting member is made of stainless steel. The first and the second extensions are joined together in an L shape with an angle less than or equal to 90°

The assembly of the fitting member and the mechanism of the exterior frame can be used to fold the backlight films without adhering the backlight films at permanently fixed position. Therefore, the thermal expansion of the backlight film is allowed to avoid the central bulge and wavy structure caused by heat.

BRIEF DESCRIPTION OF THE DRAWINGS

The present invention will become more fully understood from the detailed description given hereinbelow illustration only, and thus are not limitative of the present invention, and wherein:

FIG. 5a is a top view of the fitting member of the backlight module;

FIG. 5b is a perspective view of the fitting member of the backlight module;

DETAILED DESCRIPTION OF THE INVENTION

In a backlight module and a method of assembling the backlight module as provided, a fitting member is provided, and a backlight film is supported between an exterior frame of the backlight module and the fitting member. The structure of the fitting member is illustrated in FIGS. 2 to 7.

Figure 1:
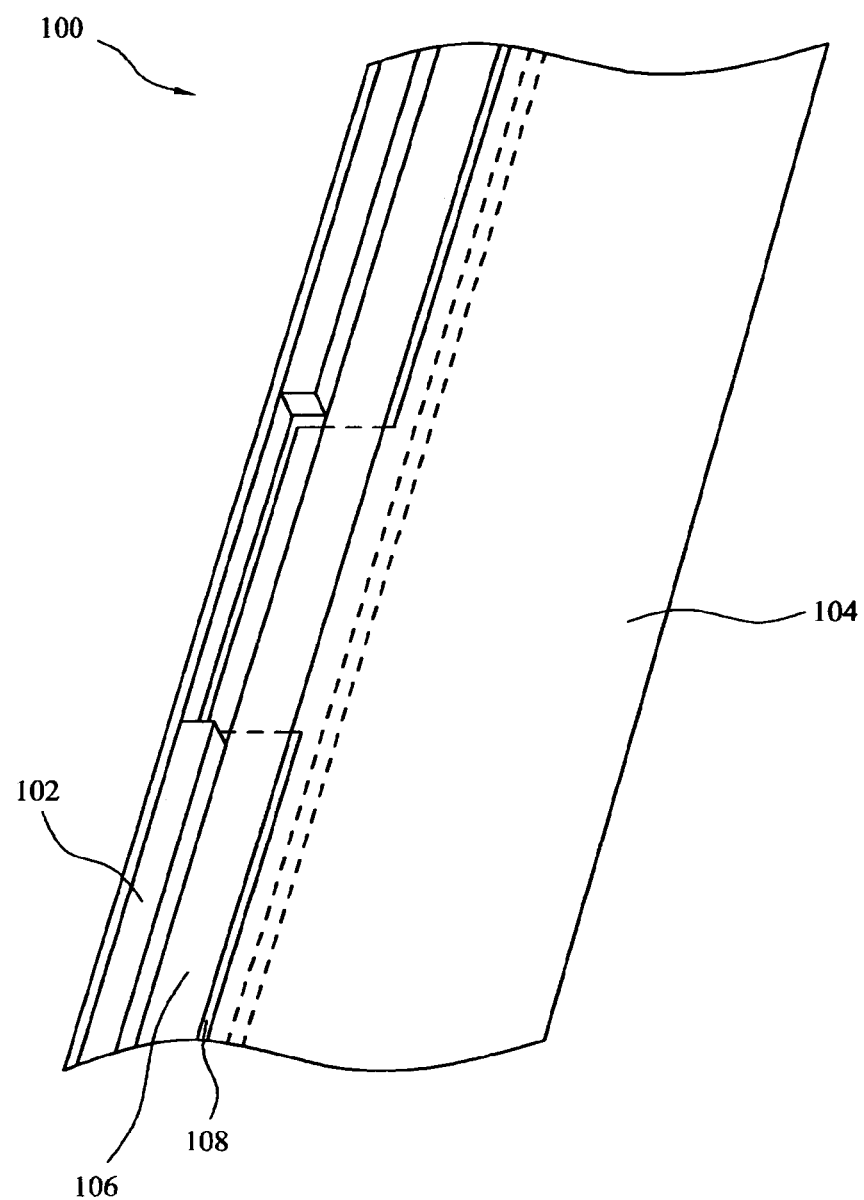
FIG. 1 shows the conventional structure of attaching the backlight films.
Figure 2:
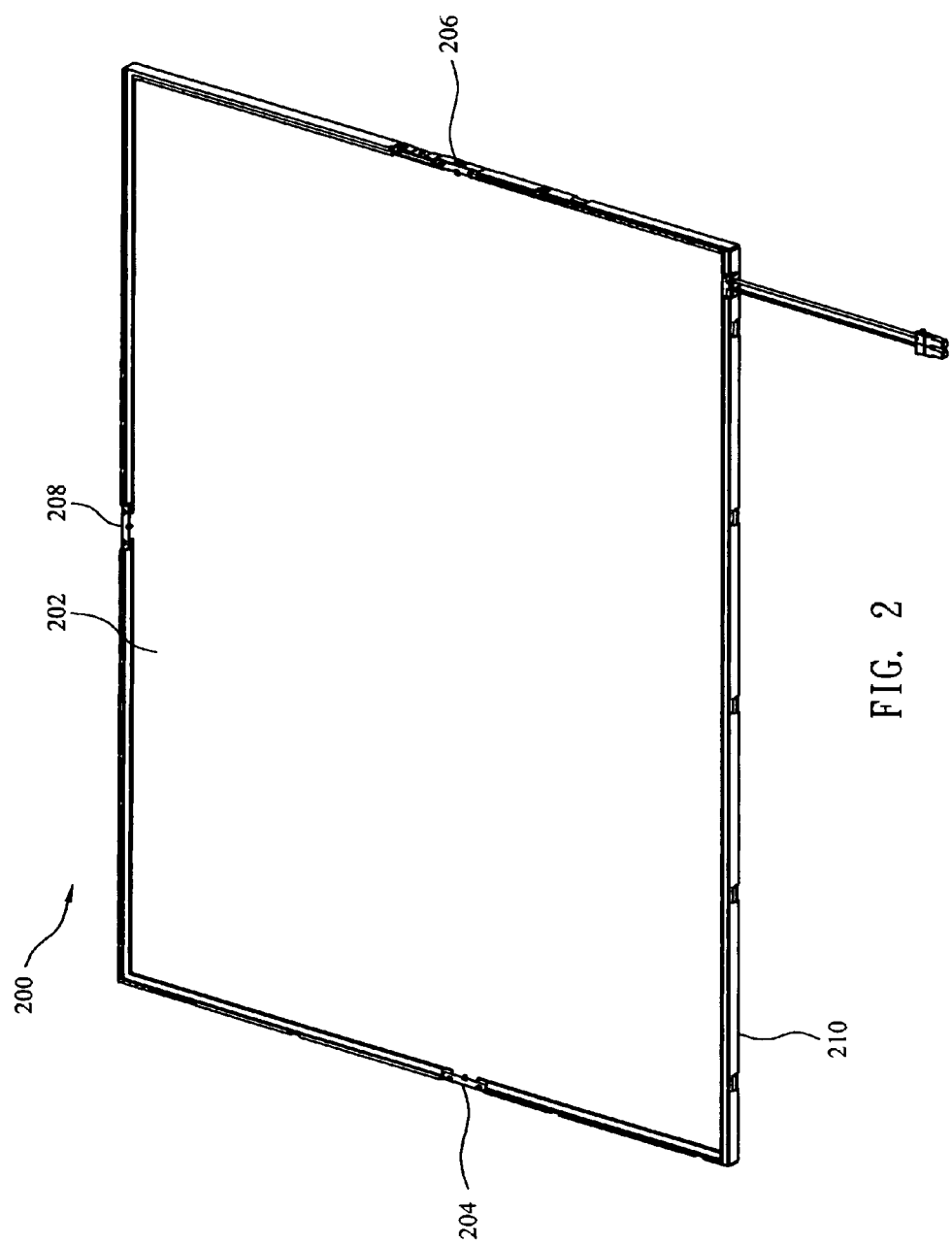
FIG. 2 is perspective view of a backlight module.
Figure 3:
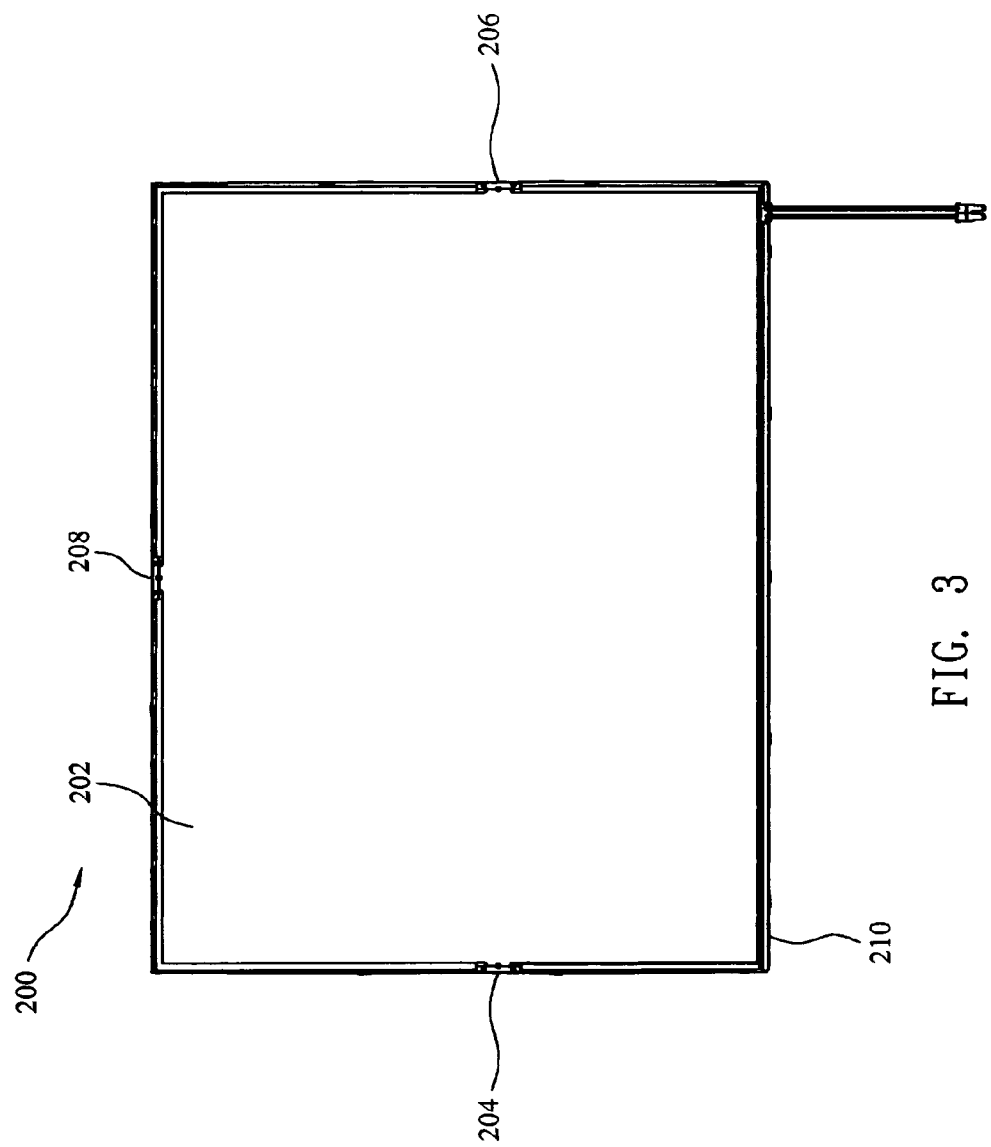
FIG. 3 is a top view of the backlight module.

Referring to FIGS. 2 and 3, the backlight module 200 is applicable to the screen of a laptop computer or a desktop LCD. In one embodiment, the backlight module 200 includes three fitting members 204, 206 and 208 for holding a backlight film 202. These three fitting 204, 206 and 208 are installed at the middles of three sides of the backlight module 200. Preferably, the cold-cathode lamp is not located at any of these three sides. Instead of using three fitting members 204 and 206, other number such as two can also be used for supporting the backlight film 202. When mere two fitting members 204 and 206 are used, preferably, they are installed at two opposing sides of the backlight module 200. The fitting members 204, 206 and 208 are preferably thin plate made of metal material such as stainless steel which is much cheaper than the silicon resin tape. Preferably but optionally, the structures of the fitting members 204, 206 and 208 are identical. The thickness of the fitting members 204, 206 and 208 is about 0.1 mm, for example.

Figure 4A:
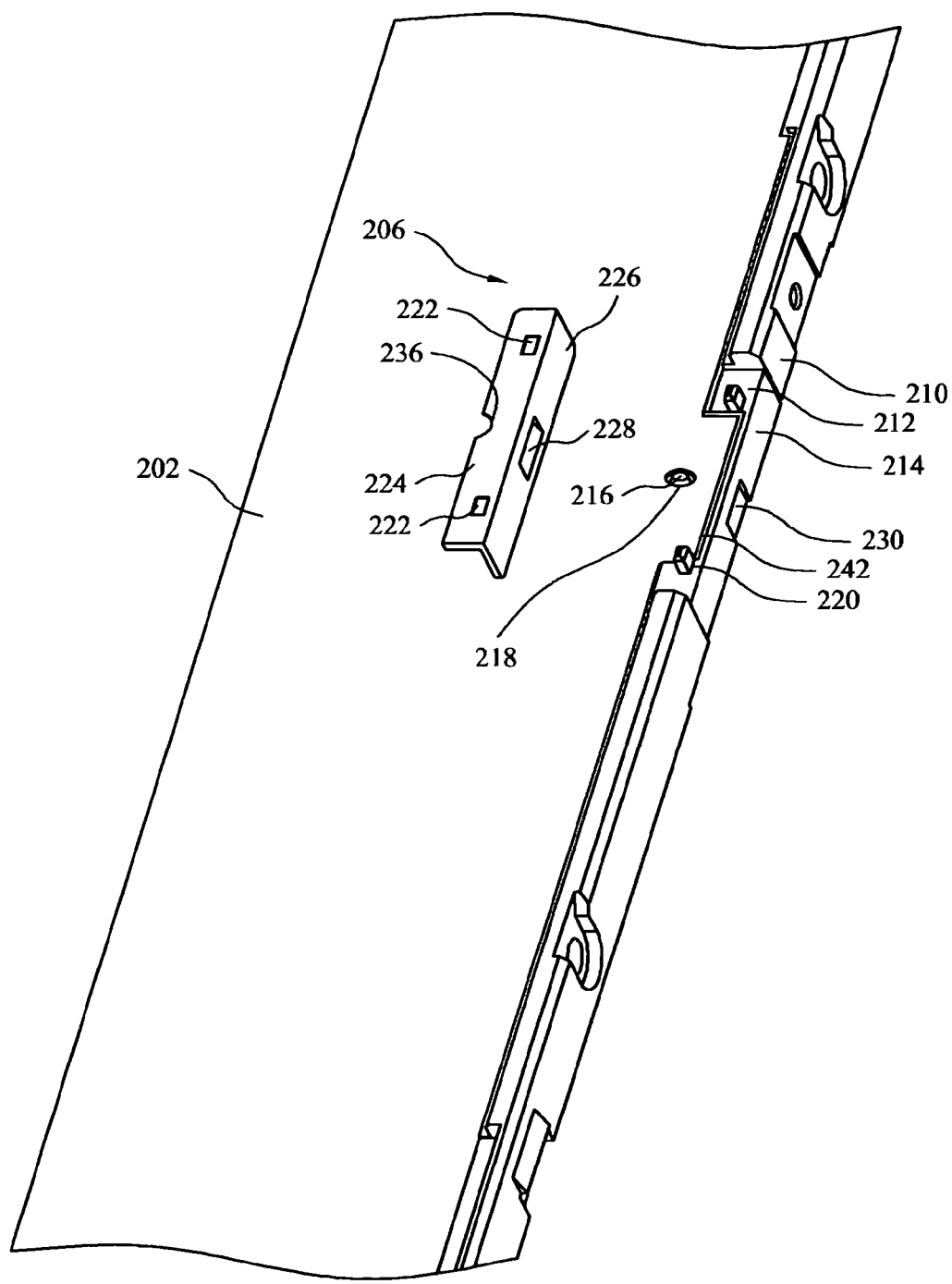
FIG. 4a shows the assembly of a fitting member of the backlight module.
Figure 5C:
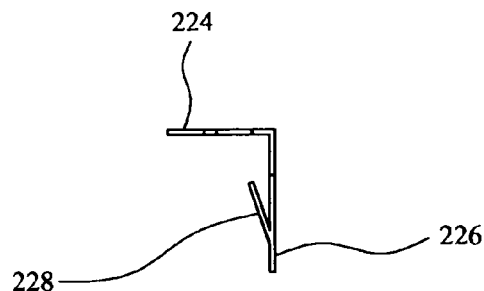
FIG. 5c is a cross-sectional view of the fitting member of the backlight module.
Figure 5D:
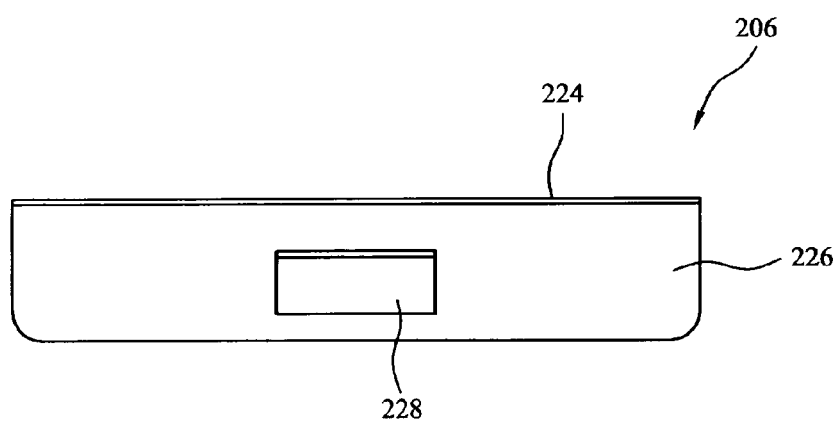
FIG. 5d is a side view of the fitting member of the backlight module.

The fitting member 206 is used as an example for illustrating the assembly process of the backlight module 200. Referring to FIGS. 4a, 5a and 5b, the fitting member 206 includes an extension 224 and an extension 226 edge-to-edge joined together. As shown, the extensions 224 and 226 are joined into an L shape with a joining angle smaller than or equal to 90°. The extension 224 includes two fitting structures 222, and the extension 226 includes a fitting structure 228 as shown in FIG. 5a. The fitting member 206 is then engaged with the exterior frame 210 of the backlight module 200. The exterior frame 210 covers a side surface of a light guide plate (not shown) of the backlight module. The exterior frame 210 includes a top surface 212 and a side surface 214. The fitting member 206 is mounted to the exterior frame 210 with the extension 226 engaged side surface 214. Therefore, corresponding to the fitting structure 222, two fitting structures 220 are formed on the top surface 212 allowing the extension 224 to be engaged with the top surface 212. In addition, a fitting structure 230 is formed on the side surface 214 allowing the fitting structure 228 to engage therewith.

The fitting structures 222 include two through holes allowing the fitting structures 222 in the form of bosses to extend through. The fitting structure 228 includes a protrusion punched on the extension 226, while the fitting structure 230 includes a slot formed on the side surface 214 matching the protrusion 228. In this embodiment, one pair of fitting structure is used to engage the extension 226 and the side surface 214, and two pairs of fitting structures are used to engage the extension 224 with the top surface 212. It will be appreciated that more than one pair of fitting structures may be used to engage the side surface 214 and the extension 226.

Figure 6:
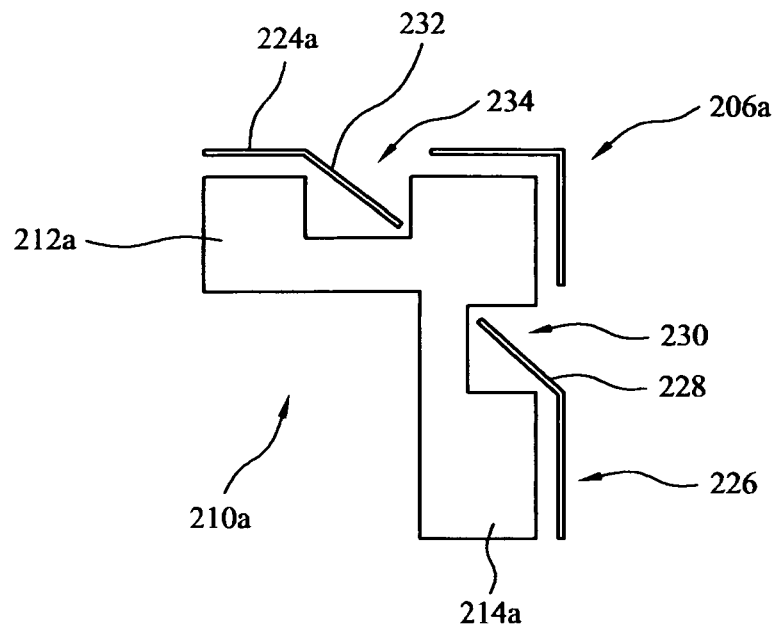
FIG. 6 is a cross-sectional view of the fitting member in another embodiment.

Referring to FIG. 6, in a second embodiment, the fitting structure 234 formed on the top surface 212a of the exterior frame 210a includes a recessed slot, while the fitting structure 232 formed on the extension 224a of the fitting member 206a includes a protruding sheet. The fitting structure 230 formed on the side surface 214a and the fitting structure 228 of the extension 226 remains the same as the previous embodiment.

Figure 7:
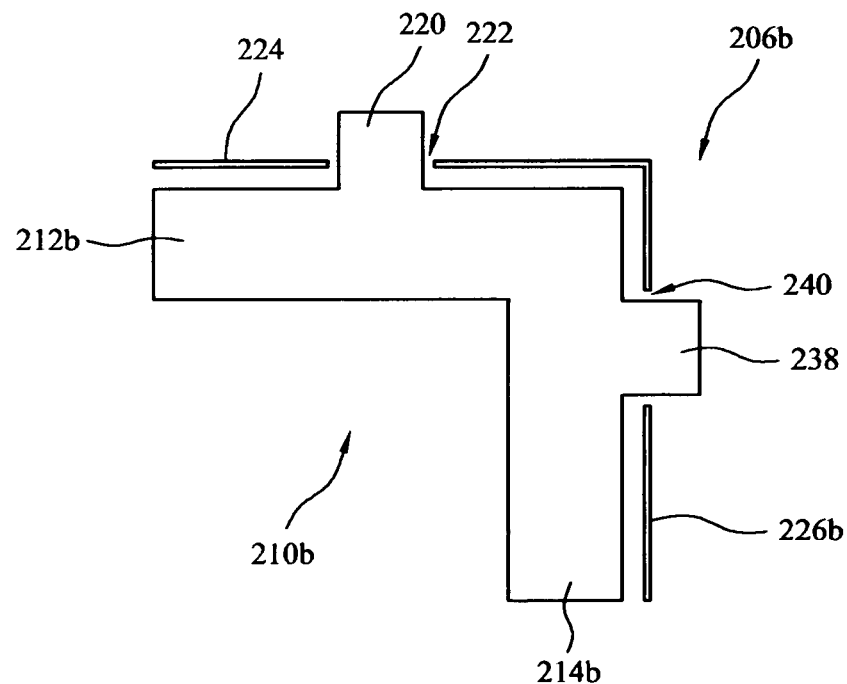
FIG. 7 is a cross-sectional view of another embodiment of the fitting member.

Referring to FIG. 7, in the third embodiment, the fitting structure 220 is protruding from the top surface 212b of the exterior frame 210b. The extension 224 of the fitting member 206b remains the same as FIG. 4a to 5b. The fitting structure 238 in the form of protrusion is formed on the side surface 214b of the exterior frame 210b, while the fitting structure 240 in the form of through hole is formed on the extension 226b of the fitting member 206b.

Figure 4B:
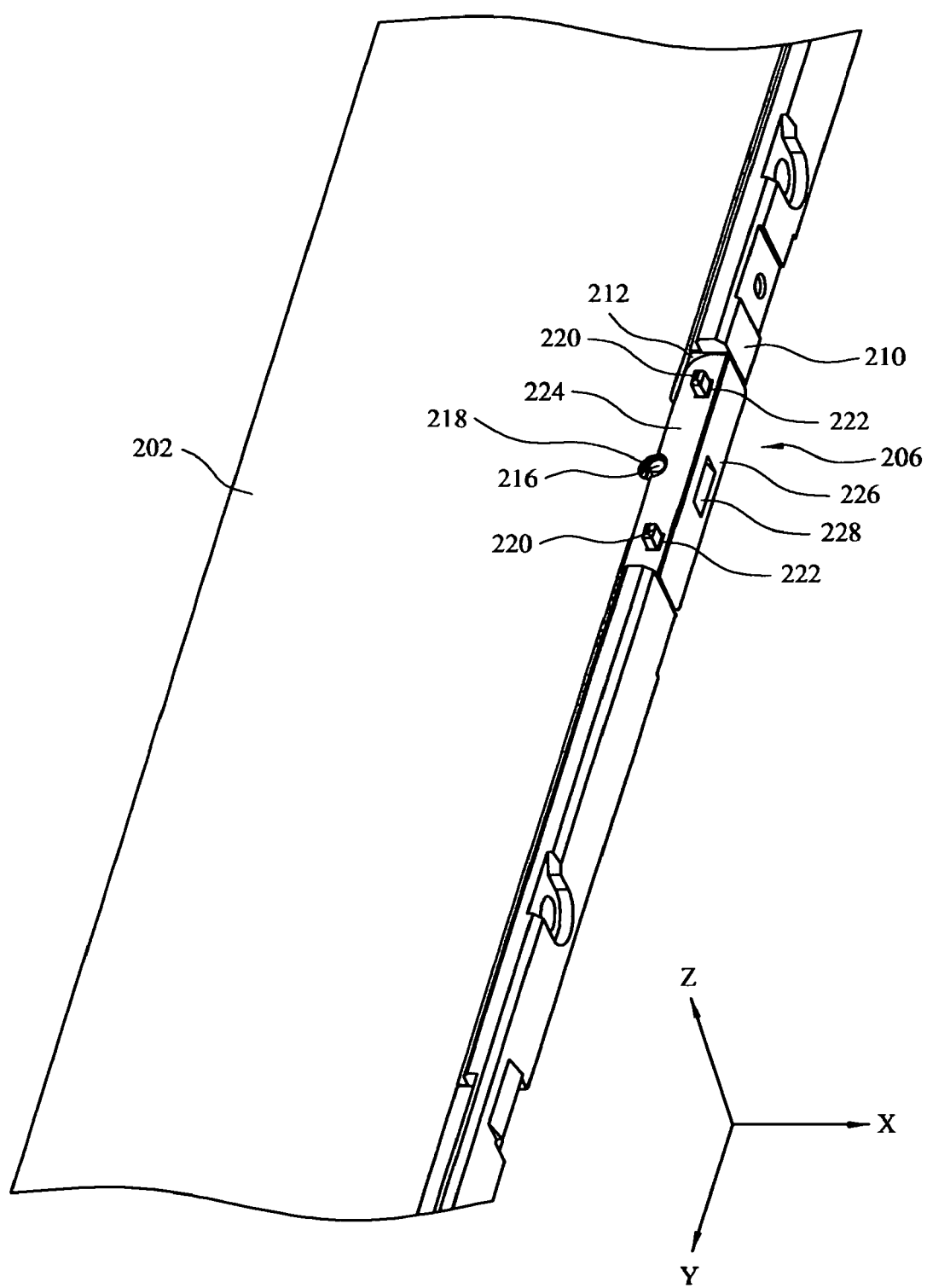
FIG. 4b is a perspective view of the fitting member of the backlight module.

Referring again to FIG. 4a, during the assembly of the backlight module 200, when the light guide plate (not shown) is inserted into the backlight module 200 and the exterior frame 210 is installed in the circumference the light guide plate, a backlight film 202 is disposed on the light guide plate. The backlight film 202 may include a prism and a diffuser. In this embodiment, the backlight film 202 includes two sheets of prism and two sheets of diffuser. For the convenience of assembly, a pin 216 is formed on the top surface 212 of the exterior frame 210, and each sheet of the backlight film 202 includes a lug 242, in which a hole 218 is formed allowing the pin to extend through. Thereby, the lugs 242 of the backlight film 202 are fitted on the exterior frame 210. The dimension of the hole 218 is preferably slightly larger than that of the pin 216, such that limited movement of the pin 216 within the hole 218 is allowed. This provides the space for thermal expansion. The lugs 242 of the backlight film 202 are located next to the fitting structures 220 of the top surface 212, preferably, between the two fitting structures 220. Referring to FIG. 4b, corresponding to the design of the pin 216 of the top surface 212 and the hole 218 of the backlight film 202, a notch 236 is formed on the front edge of the extension 224, such that the pin 216 can easily extend through the hole 218 of the backlight film 202.

When the backlight film 202 is disposed on the light guide plate with the lugs 242 of the backlight film 202 extending towards the top surface 212, the fitting structure 222 of the extension 224 of the fitting member 206 and the fitting structure 220 of the top surface 212 of the exterior frame 210 are engaged with each other. Meanwhile, the fitting structure 228 of the extension 226 of the fitting member 206 and the fitting structure 230 of the side surface 214 of the exterior frame are engaged together. By the resilience of the metal sheet of the fitting member 206, the backlight film 202 can be inserted and supported between the exterior frame 210 and the fitting member 206 as shown in FIG. 4b. Therefore, the assembly of the fitting member 206 and the exterior frame 210 does not use the silicon resin tape for permanently adhering the backlight film 202 on the exterior frame 210. Instead, an adequate contact is applied to suppress the movement of the backlight film 202 along the vertical direction (Z-direction). The backlight film 202 can thus be prevented from being peeled by external force. On the other hand, a proper gap is maintained between the extension 226 of the fitting member 206 and the backlight film 202 to allow minor movement due to thermal expansion.

From the above embodiment, the thickness of the fitting member is so thin that it is applicable to all types of displays. Therefore, the cost for developing various specifications of fitting members can be saved.

The detachment and reinstallation of the fitting member is easy, such that the assembly time of the backlight module can be greatly reduced. The fabrication cost of the backlight module can thus be reduced.

The fitting members will prevent displacement or peeling problem of films under the impact and reliability tests.

As the backlight film is not adhered to the exterior frame, displacement of the backlight film due to thermal expansion is allowed. Therefore, the forming of bulge and wavy structure will be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A backlight module suitable for use in a display, comprising:
   an exterior frame comprising at least:
   one top surface, having a first fitting structure at a first side of the exterior frame; and
   one side surface connected to one side of the top surface, the side surface having at least one second fitting structure at the first side of the exterior frame;
   at least one backlight film over a light guide plate, wherein the backlight film includes a first lug extending next to the first fitting structure; and
   a first fitting member, comprising:
   a first extension having a third fitting structure to be engaged with the first fitting structure; and
   a second extension connected to one side of the first extension, the second extension having at least one fourth fitting structure to be engaged with the second fitting structure.

2. The backlight module of claim 1, wherein the exterior frame covers a periphery of the light guide plate.

3. The backlight module of claim 1, wherein the first fitting member is made of metal material.

4. The backlight module of claim 3, wherein the first fitting member is made of stainless steel.

5. The backlight module of claim 1, wherein the first and the second extensions are joined together in an L shape.

6. The backlight module of claim 5, wherein the first and the second extensions are joined together with an angle less than or equal to 90°.

7. The backlight module of claim 1, wherein the backlight film includes a prism and a diffuser.

8. The backlight module of claim 7, wherein the backlight film includes two sheets of prism and two sheets of diffuser.

9. The backlight module of claim 1, wherein the first fitting structure includes a plurality of first fitting elements protruding from the top surface, and the third fitting structure includes a plurality of first holes allowing the first fitting elements to extend through.

10. The backlight module of claim 9, wherein the second fitting structure includes at least one slot recessed from the side surface and the fourth fitting structure includes at least one protruding sheet punched at the second extension.

11. The backlight module of claim 9, wherein the second fitting structure includes at least one second fitting element protrudes from the side surface and the fourth fitting structure includes at least one second hole formed at the second extension.

12. The backlight module of claim 1, wherein the first fitting structure includes a plurality of first slots recessed from the top surface and the third fitting structure includes a plurality of protrusions extending from the lower surface of the first extension.

13. The backlight module of claim 12, wherein the second fitting structure includes at least one second slot recessed from the side surface and the fourth fitting structure includes at least one protrusion punched from the second extension.

14. The backlight module of claim 12, wherein the second fitting structure includes at least one fitting element protruding from the side surface and the fourth fitting structure includes at least one hole formed in the second extension allowing the fitting element to extend through.

15. The backlight module of claim 1, wherein the top surface further comprises a pin protruding from the top surface, and the backlight film includes a lug with a hole allowing the pin to extend through.

16. The backlight module of claim 1, wherein the top surface at a second side opposes to the first side;
   the side surface at a second side of the exterior frame opposing the first side includes at least a sixth fitting structure;
   the backlight film further includes a second lug extending next to the fifth fitting structure of the top surface; and
   a second fitting member comprises at least:
   a third extension including at least one seventh fitting structure to be engaged with the fifth fitting structure; and a fourth extension joined with one side of the third extension, the fourth extension having an eighth fitting structure to be engaged with the sixth fitting structure.

17. The backlight module of claim 16, wherein at least one ninth fitting structure is formed on a top surface at a third side of the exterior frame;

at least one tenth fitting structure is formed on the side surface;

the backlight films further includes a third lug extending next to the ninth fitting structure of the top surface; and a third fitting structure, comprising at least:
   a fifth extension having at least one eleventh fitting structure to be engaged with the ninth fitting structure;
   a sixth extension connected to one side of the fifth extension and having at least one twelfth fitting structure to be engaged with the tenth fitting structure.

18. The backlight module of claim 1, wherein the display is for a laptop computer.

* * * * *